United States Patent [19]

Zorn et al.

[11] Patent Number: 5,799,124
[45] Date of Patent: Aug. 25, 1998

[54] ILLUMINATING SYSTEM AND METHOD FOR SPECIALIZED AND DECORATIVE LIGHTING USING LIQUID LIGHT GUIDES

[75] Inventors: Carl J. Zorn; Brian J. Kross, both of Yorktown; Stanislaw Majewski, Grafton; Randolph F. Wojcik, Yorktown, all of Va.

[73] Assignee: Southeastern Univ. Research Assn., Inc., Newport News, Va.

[21] Appl. No.: 647,677

[22] Filed: May 15, 1996

[51] Int. Cl.⁶ .................................. G02B 6/02; F21V 7/04
[52] U.S. Cl. .......................... 385/125; 385/123; 385/147; 385/901; 362/32
[58] Field of Search ...................... 385/123, 125, 385/147, 141, 900, 901; 362/32, 31

[56] References Cited

U.S. PATENT DOCUMENTS

| | | | |
|---|---|---|---|
| 3,740,113 | 6/1973 | Cass | 385/125 X |
| 4,422,719 | 12/1983 | Orcutt | 385/125 X |
| 4,685,766 | 8/1987 | Nishimura et al. | 385/125 X |
| 4,765,701 | 8/1988 | Cheslak | 385/901 X |
| 5,067,831 | 11/1991 | Robbins et al. | 385/123 |

*Primary Examiner*—Brian Healy

[57] ABSTRACT

The present invention comprises an illumination system for specialized decorative lighting including a light source, a flexible plastic tube sheath for distributing the light to a remote location, a transparent liquid core filling the tube that has an index of refraction greater than that of the plastic tube and an arrangement where light coupled from the light source is caused to leak from the liquid light guide at desired locations for the purposes of specialized lighting, such as underwater illumination in swimming pools.

15 Claims, 2 Drawing Sheets

ILLUMINATING SYSTEM AND METHOD FOR SPECIALIZED AND DECORATIVE LIGHTING USING LIQUID LIGHT GUIDES

The United States may have certain rights to this invention under Management and Operating Contract DE-AC05-84 ER 40150 from the United States Department of Energy.

This disclosure relates to U.S. patent application Ser. No. 08/546,664, pending filed on Oct. 23, 1995 entitled Flexible Liquid Core Light Guide with Focusing and Light Shaping Attachments, assigned to the same assignee, the disclosure of which application being incorporated herein by reference.

This invention relates to the use of liquid light guides for the distribution of light for decorative and specialized purposes.

Traditional light sources in which electric driven filament bulbs, neon light tubes, and similar arrangements for specialized lighting and decorative purposes are highly developed. However, in some applications, there are limitations which would be better handled by the distribution of the light through light guides and in some instances, liquid light guides. The present invention offers additional alternatives for the distribution of such light and includes submerging part of the light source itself into the liquid of a liquid light guide, a small and readily portable illumination system that is battery driven with long battery life and inexpensive, flexible, versatile and easily applied technology for the remote distribution of light from an electrically driven light source.

The present invention comprises features which include a light source, a flexible plastic tube sheath for distributing the light from the light source to a remote location, a transparent liquid core filling the tube that has an index of a refraction greater than that of the plastic tube and an arrangement where light is caused to leak from said liquid light guide at desired locations for purposes of specialized illumination and/or decorative purposes. The numerous advantages of the invention that may be achieved will be more readily understood from the following description.

DETAILED DESCRIPTION OF THE INVENTION

Figure 1:
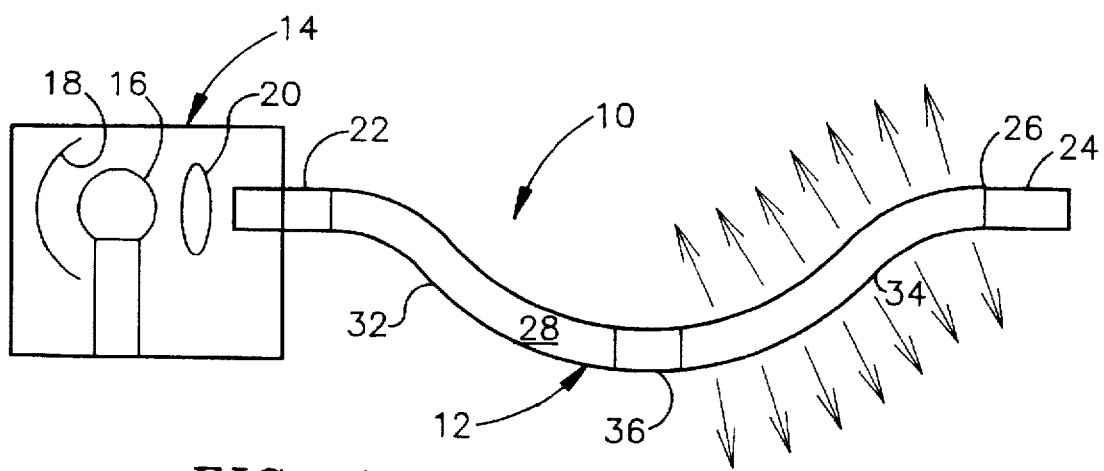
FIG. 1 is a schematic of a liquid light guide used as an illuminator including an illumination section of the guide spliced to a non-illumination section.

With reference to FIG. 1, there is shown a schematic illustration of the illumination system 10. The system includes a liquid light guide 12 having a light source 14. The light source is usually an electric filament bulb or light emitting diode or similar electric driven or activated source of photons. As shown in FIG. 1, the light source 14 has a light 16 emitting photons, some of which are reflected from reflector 18 onto a lens and some are directly impinged on lens 20 which focuses the light on the end of a light receptor plug 22 located at one end of the liquid light guide. The light source can be any suitable light source and the plug 22 can be made of any suitable material, but the preferred material is a transparent acrylic plastic which may be clamped into the tube by special clamps or the use of commercially available clamps such as Oetiker clamps used in the beverage industry. For other materials and the special clamp, reference is made to the above identified co-pending application.

The liquid light guide 12 has its distant end closed by end plug 24. On the inside of end plug 24 facing the liquid core is mirror 26 to reflect back any photons that reach the end of the light guide. The light guide has a liquid core of a transparent liquid such as mineral oil for non-toxicity. Any suitable transparent liquid may be utilized including those listed in the above-identified co-pending patent application as long as the liquid has an index of refraction greater than the flexible plastic tube sheath 30. Also, the normally free flowing liquid may be made sufficiently viscous that leaks of the liquid are prevented even if an opening occurs in the sheath or end seals. This can be accomplished by using a liquid core that increases its viscosity or changes to a gel after being placed in the sheath. Plastic sheath 30 is preferably, at least on the inside surface, made of FEP tubing or other suitable transparent or translucent material such as those identified in the co-pending patent application referred to above. The liquid light guide is composed of a light transmission section 32 whose function is to transmit the photons without any loss down the tube and an illumination section 34 whose function is to leak light from the tube for special illumination or decorative purposes. The light leakage or extraction can be caused by scratches on the interior surface of the tube as discussed more fully below. Other ways of causing a leakage or extraction of light is to pinch the tube into a sharp bend, provide prism light cuts on the inner surface, provide light scattering particles, elements utilizing other techniques for roughing the interior surface other than scratching, using reflecting surfaces and using wave shifter material on the inside of the tube or dispersed in the liquid.

The liquid light guide is designed to leak the light out in a carefully controlled manner with leaking preferably the result of roughening of the interior surface such as by scratching. The tube can be bent or shaped for specific applications, such as into text for displays or into patterns for decorative or art purposes. The tubes, being plastic material, are easily formed and are tolerant of rough handling. Since the light source can be remote from the area illuminated, the light can be piped into an enclosure via a liquid light guide leaving the hazardous electrical components out of the enclosure such as for explosion-proof lighting. It allows the electrical component to be completely outside of a hazardous enclosure. Also, the tubing permits efficient distribution of light to underwater locations such as a swimming pool or aquarium which is discussed below. It also permits the use of one centralized electric light source instead of a large array of electric lamps and permits the electric light source to be at a convenient location while the illumination candle at a remote, difficult to reach location so that changing of the light sources can be readily achieved. The tube or liquid light guide can be illuminated from both ends in which case the mirror 26 would not be needed.

The color of the light can be changed by several means. One method is to place a filter between the light source and the liquid light guide. A second is to alter the color by adding a wave shifter to the liquid core. A third means is to use colored translucent tubing with light scattering elements in the liquid core. A fourth is to deposit wave shifting material on the inside of the plastic sheath. The fifth method would be to use two concentric tubes with the inner tube being clear and the annulus between the two tubes filled with light transmitting fluid which is colored or has a suitable wave shifter therein.

In applications requiring long distances between the light source and the illuminated area, the liquid light guide can be made in coupled sections using a coupling such as 36 shown schematically in FIG. 1. The first section or light transmission section 32, is optimized for light transmission and the illumination section 34 is optimized for light scattering or for a particular color. The coupling or splice 36 can be any suitable arrangement such as welding the plastic sheath sections together or having an external coupling into which the two adjacent ends of the sheath are inserted and are fixed and/or clamped or using one long endplug with both tubes crimped to it or any other suitable method of making the coupling or splice. Also, the sheath may be internally coupled by treating only portions of the sheath to allow light leakage With reference to FIG. 2, there is shown one application for this invention where the underwater lighting of a swimming pool is achieved by using the liquid light guide as an underwater pool illuminator 40 with the light source being located outside of the pool at 14. The entire length of the pool illuminator 40 that is located underwater in the pool leaks light and serves as a strip lighter. This provides swimming pool 38 with a novel light system for use for both decorative and purposes in swimming at night.

Figure 2:
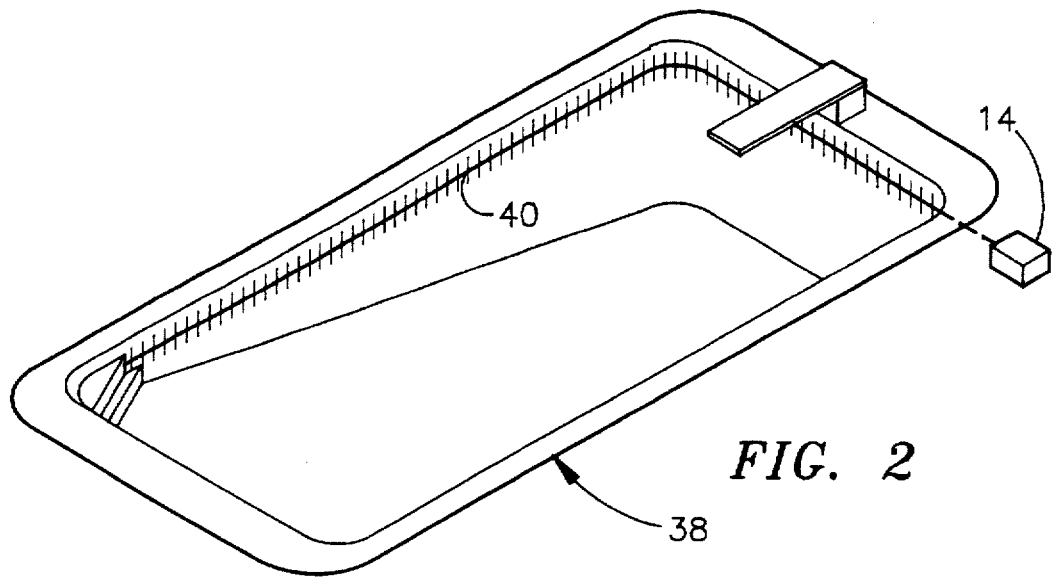
FIG. 2 shows a schematic of the liquid light guide illuminator of this invention used for the underwater illumination of a swimming pool.
Figure 3:
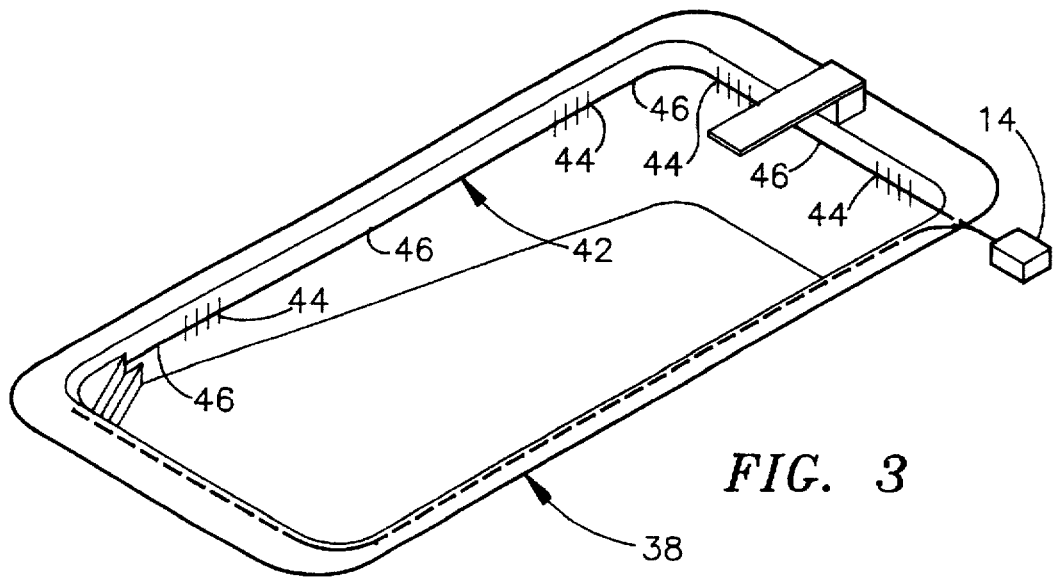
FIG. 3 is a view similar to FIG. 2 where the liquid guide only provides illumination at specific areas along the length of the light guide.

FIG. 3 is similar to FIG. 2 except the underwater pool light 42 has alternate light transmission sections 46 and illuminator sections 44 with a coupling or splice (not shown) between the sections. The underwater pool light 42 may completely encircle the pool 38 or be broken into two sections such as shown in the dotted line of FIG. 3.

The efficient distributed lighting for the swimming pool or other underwater lighting system such as shown in FIGS. 2 and 3 permit the use of a single centralized bright light source located outside of the water area with the transmission of the photons via liquid light guides to the underwater location. This way, all hazards associated with installing an array of electrical lamps that must be sealed against water leaks is avoided. An additional savings are associated with requiring only one centralized electric source instead of a large array of lamps.

Figure 4:
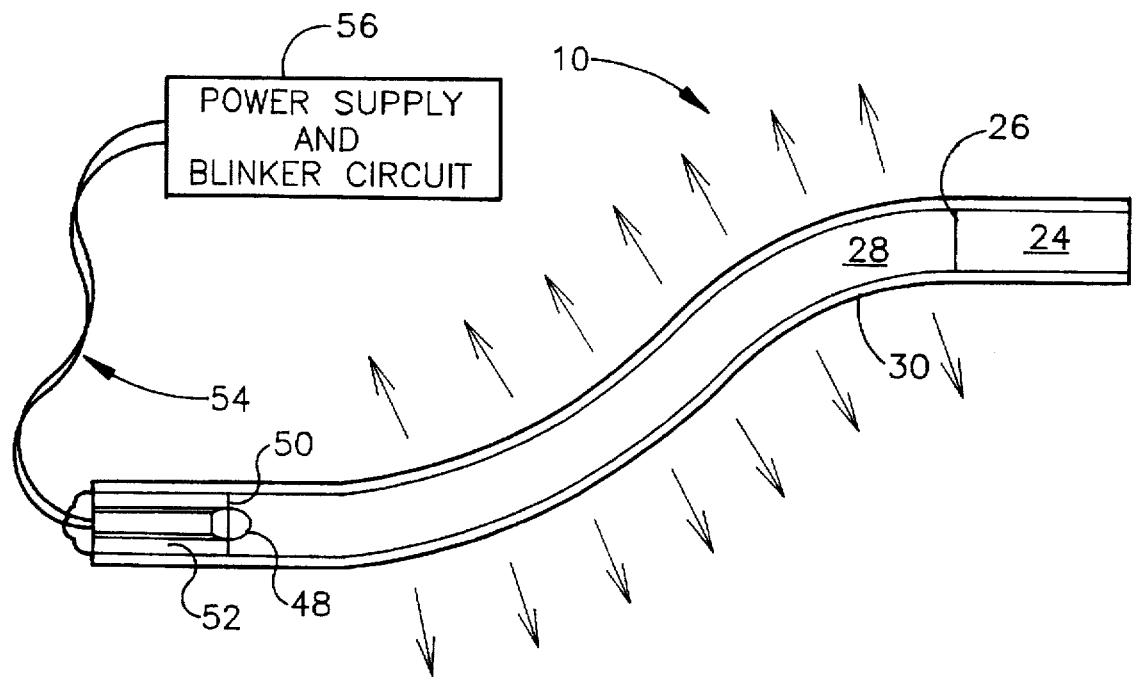
FIG. 4 is a schematic cross section of a portable illuminating liquid light guide where the light source is in direct contact with the liquid core.

With reference to FIG. 4, as shown, a portable lightweight, long lasting battery driven illuminator system light source comprises a readily available light emitting diode, preferably red, which can be driven by three volts. The light emitting diode 48 is directly emerged in the liquid core 28 for maximum transmission of the emitted photons with the liquid core also serving to cool the light emitting diode. Sometimes the light emitting diode may have a small lens molded to its outer surface as it comes from the factory. This would also be emerged directly into the liquid core. Surrounding the light emitting diode 48 is an annular mirror 50 to reflect any photons back into the liquid core. The light emitting diode is held in the interior of the plastic sheath 30 by an annular plug 52. This is better seen in FIG. 5 where the annular plug and light emitting diode are held together by a suitable liquid type seal 58 and an external sealant 60 located on the end of illuminator system and also surrounding the end of the electrical connection wires 54. The electrical connection wires 54 as seen in FIG. 4 are connected to a suitable power supply and blinker circuit. This circuit which contains a power supply of two 1.5 volt batteries and an off the shelf flasher circuit chip plus a circuit and switch providing, preferably, a one second "on" and one second "off" flashing. The details of the circuit are not shown since they are readily available and readily understood by a person of skill in the art.

Figure 5:
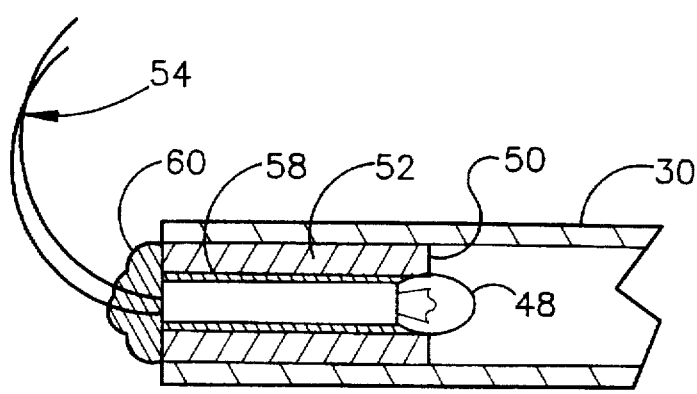
FIG. 5 is an enlarged section of FIG. 4 showing schematically the details of the position of the light source with the end of the light guide.

Utilizing this arrangement, the portable illumination system of FIGS. 4 and 5 has run for weeks on a suitable battery. Instead of having a plug 24 and mirror 26 at the remote end, another light emitting diode of the same for different color, such as green or yellow, may be utilized and driven by the same blinker circuit. The colors if different are preferably alternated one to the other by the blinker circuit.

The preferred method for scattering the light to cause it to leak or be extracted or emitted to the exterior of the illuminator system is by roughening the interior surface. The preferred method of creating such roughening is by scratching with a stainless steel brush. In order to do this, a stainless steel brush having an outside diameter slightly greater than the inside diameter of the plastic sheath 30 is pulled through the sheath so as to scratch the interior surface and cause the photons to leak from the interior of the liquid core.

The invention lends itself for numerous applications. Some of those which have already been utilized by the inventors include motorcycle and bicycle lights (two feet in length) which can function as both emergency lights and turn signals, back panel illumination, outlining for fish tanks, mail box lights and emergency triangular lights for night time roadside emergencies.

Many variations and modifications may be made utilizing the above disclosure. It is therefore to be understood that within the scope of the appended claims, the invention may be practiced other than as specifically described.

We claim:

1. An illumination system comprising:

a flexible plastic tube sheath having a first end, a second end, and an inside surface with a first index of refraction and being transparent or translucent over at least a portion of said sheath;

a transparent liquid core filling said sheath having a second index of refraction which is greater than said first index of refraction;

a first electrically activated light source in direct contact with said liquid core;

a first seal for sealing said first electrically activated light source in said first end of said sheath in a liquid tight seal;

a second light source at said second end of said sheath;

a second seal for sealing said second end of said sheath in a liquid tight seal; and a light extraction device for causing light to be emitted from said sheath at said transparent or translucent portion thereof.

2. The illumination system of claim 1 wherein said second light source is a mirror reflecting light from said electrically activated light source.

3. The illumination system of claim 1 wherein said second light source is a second electrically activated light source.

4. The illumination system of claim 1 wherein said second light source is a second electrically activated light source having a different wavelength then said first electrically activated light source.

5. The illumination system of claim 1 wherein said system includes a power supply and blinker circuit for causing said first electrically activated light source to blink on and off.

6. The illumination system of claim 5 where said power supply and blinker circuit causes said second electrically activated light source to blink on and off at alternate times with said first electrically activated light source blinking on and off.

7. The illumination system of claim 1 which further includes an annular mirror surrounding said first electrically activated light source.

8. The illumination system of claim 1 wherein said first electrically activated light source in a light emitting diode.

9. The illumination system of claim 1 wherein said light extraction device is a surface roughness on the inside of said possible plastic sheath.

10. The illumination of claim 9 wherein said surface are scratches.

11. The illumination system of claim 1 wherein said light extraction device is a sharp bend in said flexible plastic sheath of sufficient sharpness to cause light to emit there from.

12. The illumination of claim 1 wherein said flexible plastic tube sheath has at least two sections joined together with one section being a light transmission section and a second section being a light emitting section which has said light extraction device therewith.

13. An underwater illumination system comprising:
   an underwater structure such as a swimming pool or aquarium;
   a flexible plastic tube sheath having a first end, a second end, and an inside surface with a first index of refraction and being transparent or translucent over at least a portion of said sheath with at least part of said sheath located underwater in said swimming pool or aquarium;
   a transparent liquid core filling said sheath having a second index of refraction which is greater than said first index of refraction;
   a first electrically activated light source directing light to said liquid core;
   a first seal for sealing said first end of said sheath in a liquid tight seal;
   a second light source at said second end of said sheath;
   a second seal for sealing said second end of said sheath in a liquid tight seal; and
   a light extraction device for causing light to be emitted from said sheath at said transparent or translucent portion thereof.

14. The underwater system of claim 13 wherein said second light source is a mirror reflecting light from said electrically activated light source.

15. The underwater illumination system of claim 13 wherein said flexible plastic tube sheath has a multiplicity of underwater sections joined together with some sections being light transmission sections and some sections being light emitting sections.

* * * * *